US012799000B2

(12) United States Patent
Kieser

(10) Patent No.: US 12,799,000 B2
(45) Date of Patent: Nov. 17, 2026

(54) COMPACT AGRICULTURAL PHOSPHORUS TREATMENT STRUCTURE

(71) Applicant: Great Lakes Protection Fund, Evanston, IL (US)

(72) Inventor: Mark Stephen Kieser, Portage, MI (US)

(73) Assignee: Great Lakes Protection Fund, Evanston, IL (US)

( * ) Notice: Subject to any disclaimer, the term of this patent is extended or adjusted under 35 U.S.C. 154(b) by 967 days.

(21) Appl. No.: 17/678,868

(22) Filed: Feb. 23, 2022

(65) Prior Publication Data

US 2023/0264980 A1 Aug. 24, 2023

(51) Int. Cl.

| | |
|---|---|
| ***C02F 1/28*** | (2023.01) |
| ***B01D 15/10*** | (2006.01) |
| ***E03F 1/00*** | (2006.01) |
| *C02F 101/10* | (2006.01) |
| *C02F 103/00* | (2006.01) |
| *C02F 103/10* | (2006.01) |

(52) U.S. Cl.

CPC .............. *C02F 1/281* (2013.01); *B01D 15/10* (2013.01); *C02F 1/288* (2013.01); *E03F 1/005* (2013.01); *C02F 1/283* (2013.01); *C02F 2101/105* (2013.01); *C02F 2103/001* (2013.01); *C02F 2103/10* (2013.01); *C02F 2201/002* (2013.01); *C02F 2307/00* (2013.01)

(58) Field of Classification Search

CPC .......... C02F 1/281; C02F 1/288; C02F 1/283; C02F 2103/001; C02F 2103/10; C02F 2201/002; C02F 2307/00; C02F 2101/105; B01D 15/10; E03F 1/005

USPC ................................ 210/747.3, 170.03, 906

See application file for complete search history.

(56) References Cited

U.S. PATENT DOCUMENTS 5,330,651 A * 7/1994 Robertson ............. C02F 3/2806 210/170.03
5,427,683 A * 6/1995 Gershon ................. C02F 1/003 210/264

(Continued)

FOREIGN PATENT DOCUMENTS

DE 4117040 C2 * 11/1994 ......... B01D 17/0202

OTHER PUBLICATIONS

Machine-generated English translation of DE 4117040, generated on May 9, 2025.*

*Primary Examiner* — Fred Prince
(74) *Attorney, Agent, or Firm* — Dennemeyer & Associates LLC

(57) ABSTRACT

Systems and devices for treating water runoff. A water runoff treatment device includes a primary receptacle and a secondary receptacle separated by a barrier having at least one treatment port to permit water to pass from the primary receptacle to the secondary receptacle. A runoff water inlet on one side of the primary receptacle receives drain flow into the primary receptacle. At least one treatment tank having a treatment medium is mounted over a corresponding one of the treatment ports. The at least one treatment tank includes a treatment tank opening to receive water for treatment by the treatment medium. The treatment tank connects to the treatment port to pass treated water into the secondary receptacle. A drain port is formed in the secondary receptacle to pass treated water out and into a flow of treated water.

14 Claims, 6 Drawing Sheets

(56) References Cited

U.S. PATENT DOCUMENTS

| | | | | |
|---|---|---|---|---|
| 5,788,849 | A * | 8/1998 | Hutter, Jr. | B01J 20/20<br>210/170.03 |
| 6,926,464 | B1 * | 8/2005 | Weidmann | E03F 5/0404<br>210/170.03 |
| 11,420,880 | B2 * | 8/2022 | Holtz | B01D 29/52 |
| 2003/0175079 | A1 * | 9/2003 | Happel | B01D 29/05<br>405/36 |
| 2004/0222159 | A1 * | 11/2004 | Peters, Jr. | B01J 39/14<br>210/170.03 |
| 2008/0245710 | A1 * | 10/2008 | Mitchell | E03F 1/00<br>210/170.03 |
| 2011/0062088 | A1 * | 3/2011 | Olson | B01D 29/15<br>210/170.03 |
| 2011/0309017 | A1 * | 12/2011 | Hassler | B01J 41/14<br>210/764 |
| 2013/0180903 | A1 * | 7/2013 | Kowalsky | E03F 5/0404<br>210/170.03 |
| 2014/0374332 | A1 * | 12/2014 | Hannah | E03F 5/14<br>210/170.03 |
| 2019/0282932 | A1 * | 9/2019 | Kent | E03F 5/16 |

* cited by examiner

COMPACT AGRICULTURAL PHOSPHORUS TREATMENT STRUCTURE

BACKGROUND

Agricultural runoff includes rainwater plus any particulate debris and dissolved materials that the rainwater may entrain as it traverses either the soil surface or the soil profile before entering drainage pipes. Both surface runoff and subsurface drainage from agricultural fields typically flow into artificially constructed drainage ditches or other surface water bodies. Given that the fields this drainage originates from typically receive external nutrient inputs; agricultural runoff and drainage can constitute a significant form of non-point source pollution. Agricultural non-point source phosphorus pollution in particular is often the primary cause of harmful algal blooms in surface water bodies. While many agricultural conservation practices have been installed to mitigate surface runoff, there are few practices available that mitigate dissolved phosphorus loading from runoff and tile drainage.

One solution to the introduction of phosphorus pollution in the drain water is provided by a tile system in which water runoff from tiles or soil is diverted to an area that has been filled with a layer of iron slag or iron enhanced sand to capture the runoff. The tiles are typically large networks of drainage conduits embedded in soils. The drainage conduits are designed to divert runoff water into the areas containing the filter media to filter the water runoff for up to about 10 years. The filter areas are difficult to maintain and media replacement after ten years is often impractical.

SUMMARY

In view of the above, a system for treating water runoff is provided. In example systems, a water runoff treatment device includes a primary receptacle and a secondary receptacle separated by a barrier having at least one treatment port to permit water to pass from the primary receptacle to the secondary receptacle. A runoff water inlet is formed on one side of the primary receptacle. The runoff inlet is connected to a drainage conduit to receive drain flow into the primary receptacle. At least one treatment tank comprising a treatment medium is mounted over a corresponding one of the treatment ports in the primary receptacle. The at least one treatment tank includes a treatment tank opening configured to receive water in the primary receptacle for treatment by the treatment medium. The at least one treatment tank is connected to the treatment port to pass treated water into the secondary receptacle. At least one drain port is formed in the secondary receptacle to pass treated water out of the secondary receptacle and into a flow of treated water.

In one aspect, a single water runoff treatment device may be used to treat water runoff from a network of drainage conduits. The drainage conduits may include a series of openings on an upper surface of the drainage conduits to capture water runoff. The water runoff may be directed to an outlet drainage conduit attached to the water runoff treatment device.

In another aspect, multiple water runoff treatment devices may be connected to corresponding outlet drainage conduits to treat the water runoff. The treated water runoff may flow from the water runoff treatment device into a pool or stream of treated water runoff.

DETAILED DESCRIPTION

Water that flows through soil in fields of agriculture or fields having other uses may contain high levels of soluble phosphorus. The water becomes water runoff that eventually drains into water supplies including lakes and reservoirs. Phosphorus has been identified as a primary cause of harmful algal blooms in surface water bodies. Described below are systems and apparatuses for treating water runoff to substantially mitigate the buildup of phosphorus in surface water bodies.

Figure 1:
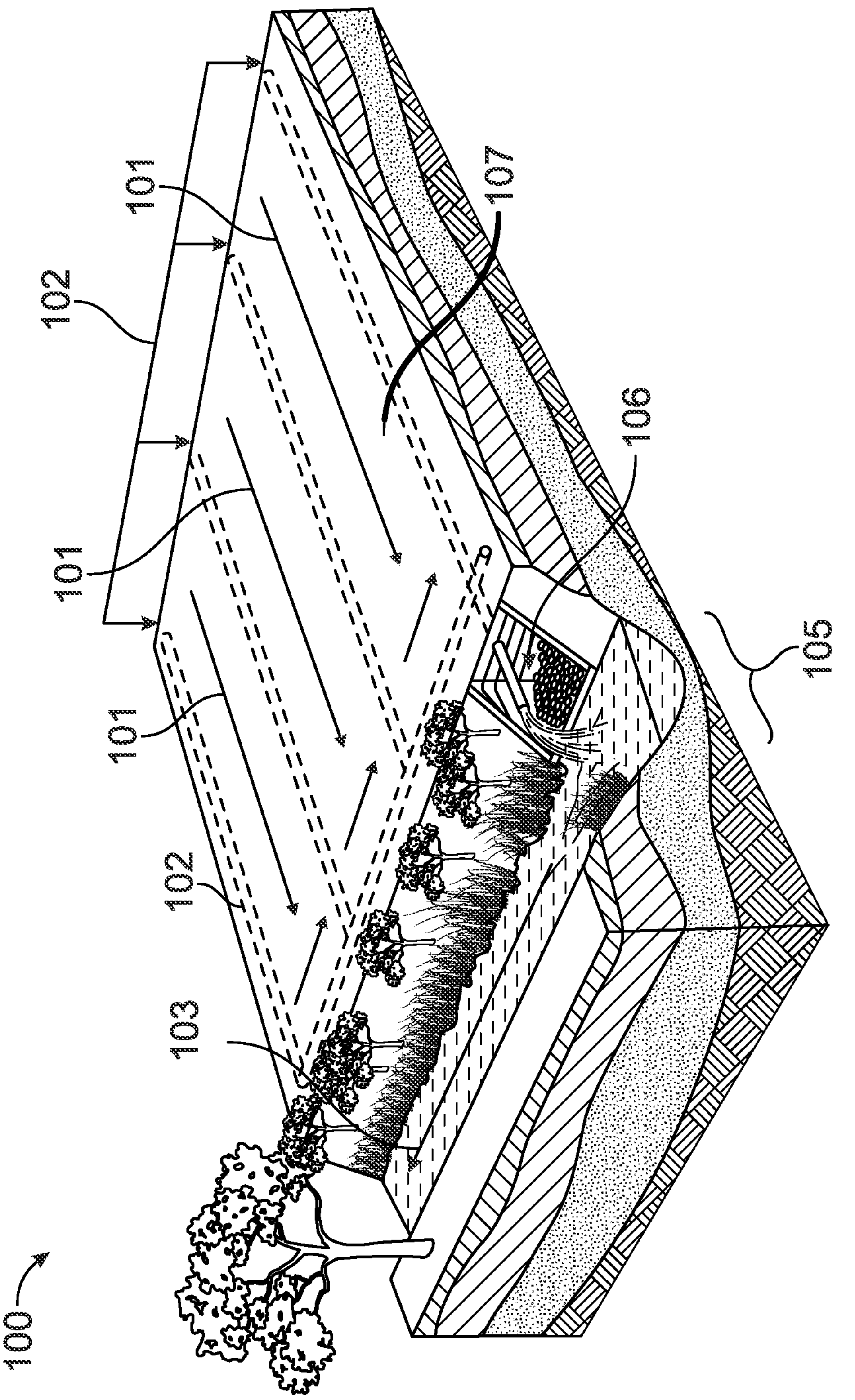
FIG. 1 is a schematic diagram illustrating operation of a water runoff tile system for draining runoff water from a section of soil.
Figure 2:
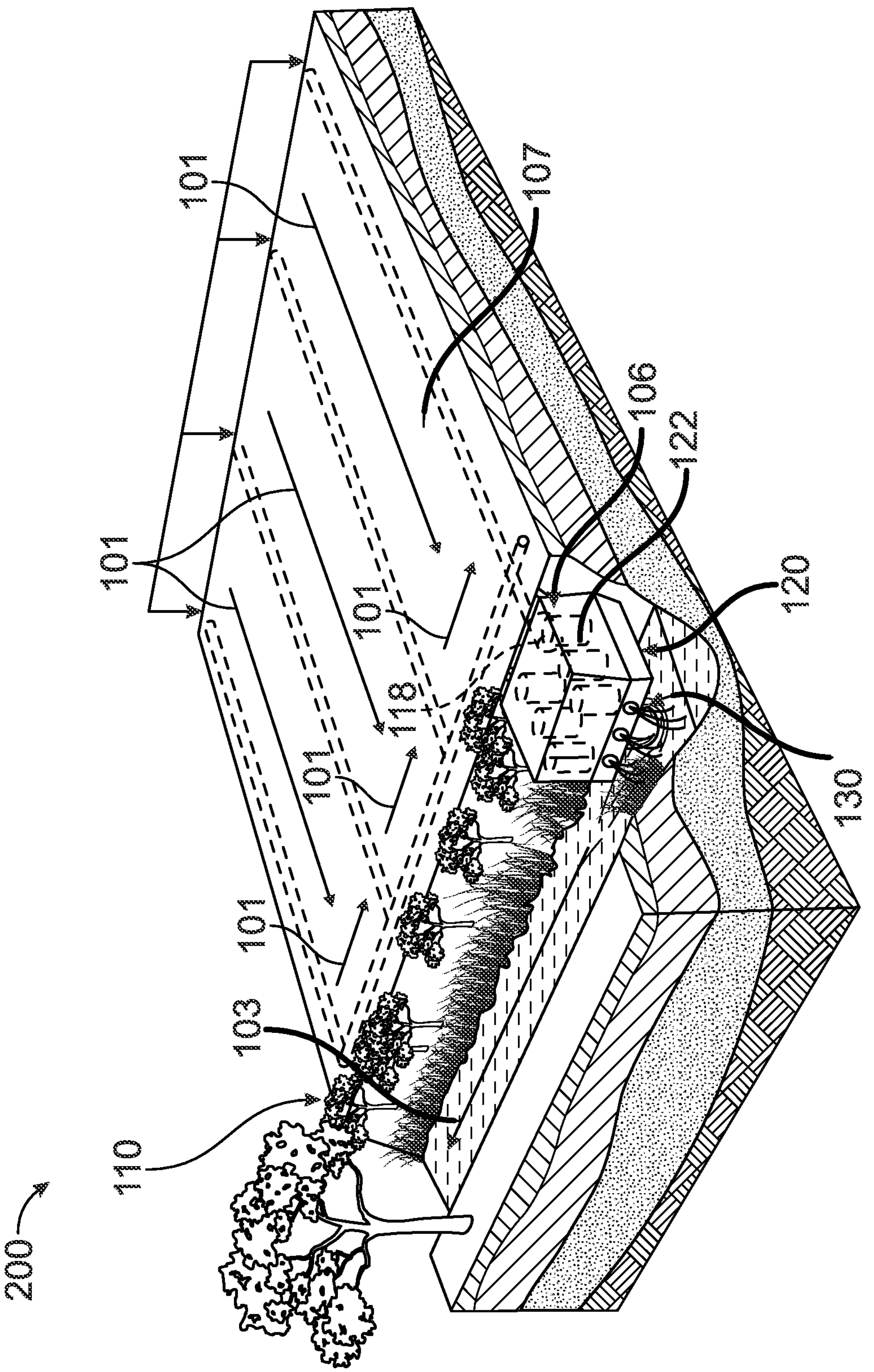
FIG. 2 is a schematic diagram illustrating operation of a system for treating water runoff using an example implementation of a water runoff treatment device.

FIG. 1 is a schematic diagram illustrating operation of a water runoff tile system 100 for draining runoff water from a section of soil 107. FIG. 2 is a schematic diagram illustrating operation of a system 200 for treating water runoff using an example implementation of a water runoff treatment device 120 in the section of soil 107 shown in FIG. 1 Referring to FIGS. 1 and 2, the water runoff tile system 100 drains runoff water along a flow direction at 101 without treatment such that phosphorus may be entrained with the water runoff. The water may be collected in a network of drainage conduits 102 directing water towards a drain ditch 105. The drainage conduits 102 may direct water towards a header drainage conduit 110, which directs water to an outlet drainage conduit 106. The outlet drainage conduit 106 allows the water runoff to flow into the ditch 105, which may be configured to allow the water runoff to flow in a stream at 103.

The system 200 in FIG. 2 includes the water runoff treatment device 120 attached to the outlet drainage conduit 106 at a water runoff inlet 118 formed on one side of the water runoff treatment device 120. The water runoff treatment device 120 includes at least one treatment tank 122 in a primary receptacle (described below with reference to FIGS. 3-6). The water is treated by the treatment tanks 122 and allowed to flow into a secondary receptacle (described below with reference to FIGS. 3-6). The water is then allowed to drain from one or more drain ports 130 into the ditch 105.

It is noted that the system 200 in FIG. 2 depicts a single water runoff treatment device 120. Multiple water runoff treatment devices 120 may be used to handle larger volumes of water from larger tiles. Each water runoff treatment device 120 may also be configured by varying aspects of the device 120 to handle certain flows of water runoff as desired. The water runoff treatment devices 120 may be installed and after a predetermined period of time, the treatment tanks 122 or the filter media in the treatment tanks 122 may be easily replaced to continue filtering the water runoff.

Figure 3:
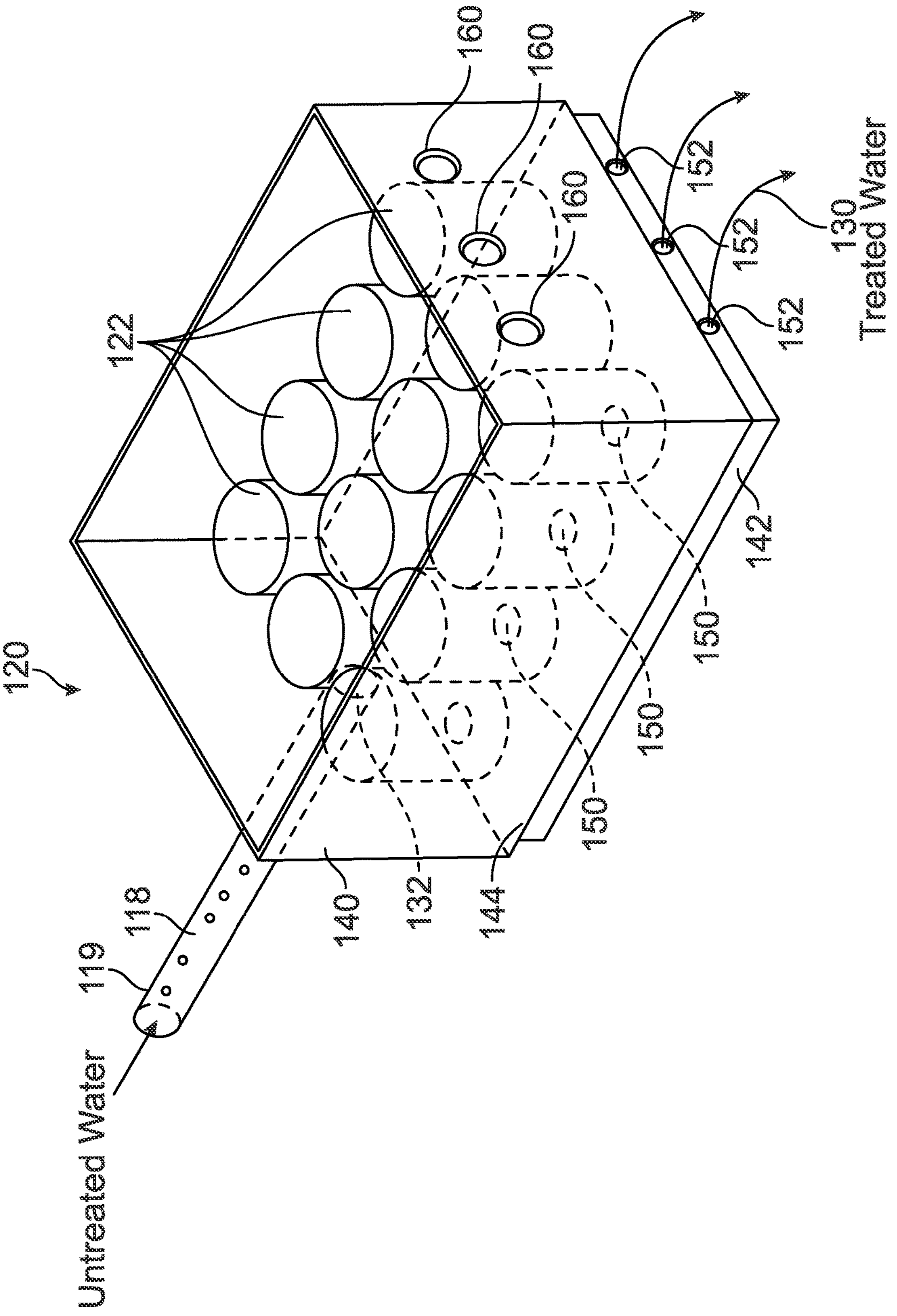
FIG. 3 is a transparent isometric view of an example water runoff treatment device that may be used in the system in FIG. 2.

FIG. 3 is a transparent isometric view of an example water runoff treatment device 120 that may be used in the system 200 in FIG. 2. The water runoff treatment device 120 is depicted in FIG. 3 as having a connection to an outlet drainage conduit 118 to receive untreated water from the tile 100 (in FIG. 1). The outlet drainage conduit 118 includes opening 119 on an upper surface of the conduit 118 to receive untreated water from the soil.

The water runoff treatment device 120 in FIG. 3 includes a primary receptacle 140, a water runoff inlet 132 connected to the outlet drainage conduit 118 to receive the untreated water, a secondary receptacle 142, and a barrier 144 separating the primary receptacle 140 and the secondary receptacle 142. A plurality of treatment tanks 122 are mounted on the barrier 144 over corresponding treatment ports 150 formed in the barrier 144. The treatment tanks 122 include filter media configured to treat the untreated water that enters each treatment tank 122 then passes into the secondary receptacle 142 through the treatment ports 150.

In example implementations, the treatment tanks 122 are configured in size and with filter media having a desired density such that the untreated water contacts the filter media for a desired amount of time before it exits through the treatment ports 150. The treated water collects in the secondary receptacle 142 and flows out through drain ports 152 formed on one or more sides of the secondary receptacle 142. The treated water 130 may flow out and collect or flow into the surrounding ecosystem to eventually flow into the surface water bodies. The treated water 130 flows with a substantially reduced level of phosphorus thereby mitigating the algal blooms in the surface water bodies. The primary receptacle 140 in FIG. 3 also includes a series of overflow ports 160. The water runoff may flow at different rates at different times. In periods where storms or steady rain may cause water runoff to flow in larger than normal volumes, the water runoff treatment device 120 may not contain all of the water. The excess water would then be allowed to flow out of the overflow ports 160 as untreated water.

Figure 4:
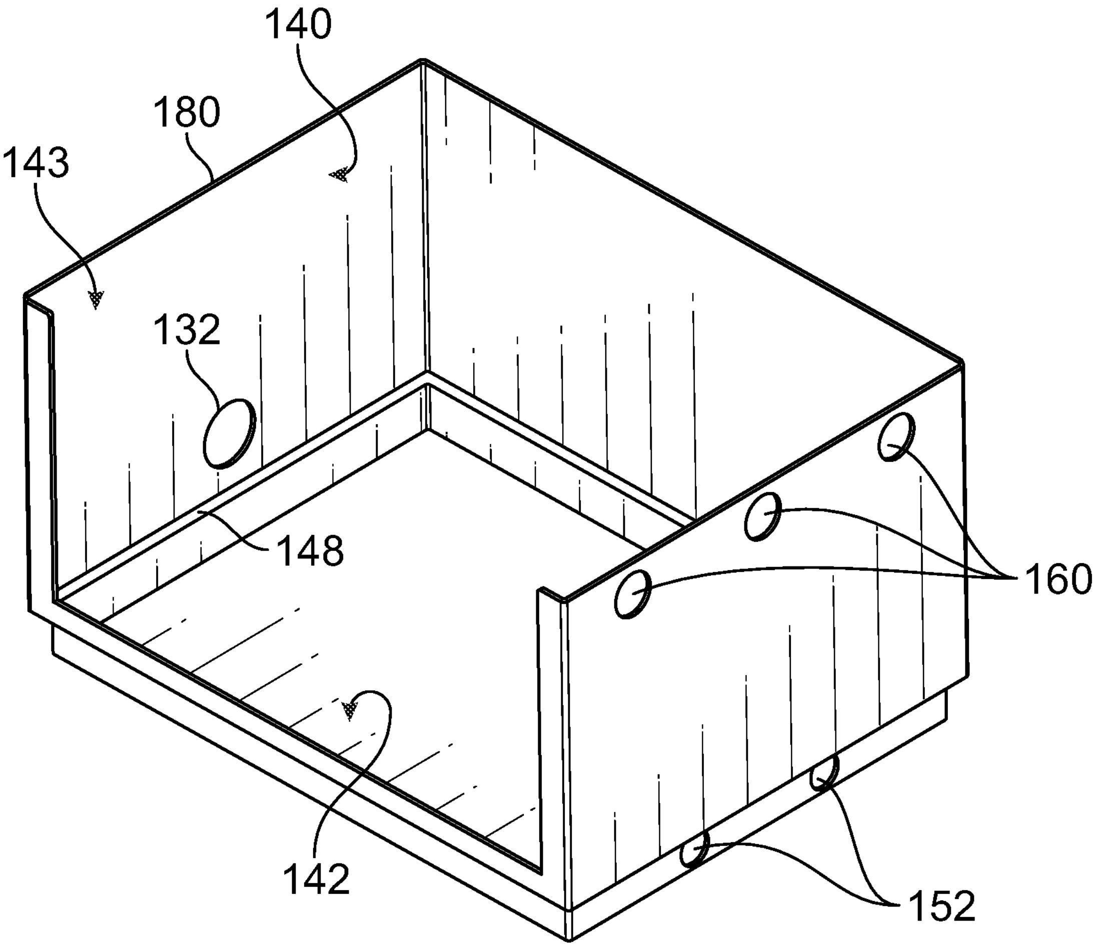
FIG. 4 is an isometric view of an example housing portion of an example water runoff treatment device with a wall removed to expose an inside of the housing portion.

FIG. 4 is an isometric view of an example housing portion 180 of an example water runoff treatment device with a wall removed at 143 to expose an inside of the housing portion 180. The housing portion 180 in FIG. 4 includes a portion for the primary receptacle 140 and a lower portion for the secondary receptacle 142. The primary receptacle 140 and the secondary receptacle 142 may be separated by the barrier 144 (shown in FIG. 3) laid on a ledge 148 and provided with a seal to ensure that the water flows from the primary receptacle 140 to the secondary receptacle 142 through the treatment tanks and treatment ports only. In another example implementation, the secondary receptacle 142 may be a separate housing that fits into the lower portion of the housing portion 180 in FIG. 4. The secondary receptacle 142 formed as an independent housing may include openings on an upper surface to provide treatment ports 150 (see FIG. 3) and openings on at least one side to mate with drain ports 152.

In example implementations, the housing portion 180 forming the primary receptacle 140 and the secondary receptacle 142 may be made of a molded thermoplastic. In other implementations, other suitable materials may be used where such materials provide sufficient support and durability in environments in which the device is in contact with soil, water and other materials.

Figure 5:
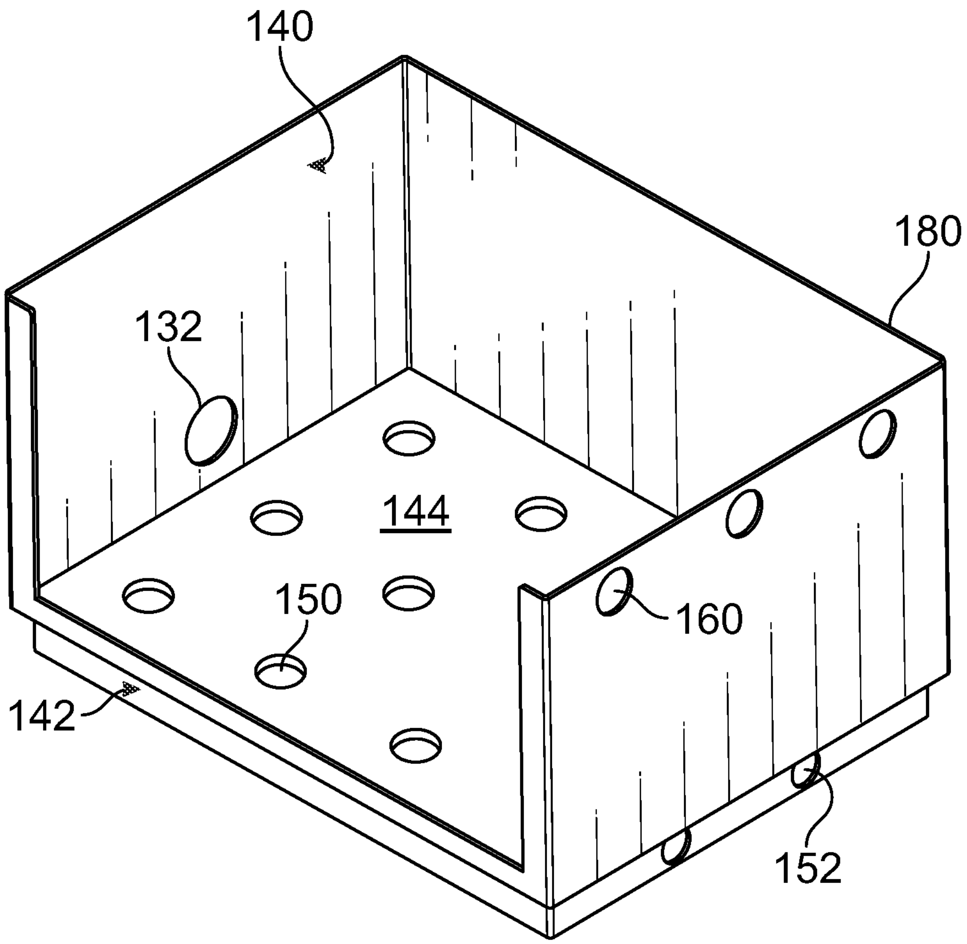
FIG. 5 is an isometric view of the housing portion of FIG. 4 fitted with an example implementation of a barrier with treatment ports opening to the secondary receptacle.

FIG. 5 is an isometric view of the housing portion 180 of FIG. 4 fitted with an example implementation of a barrier 144 with treatment ports 150 opening to the secondary receptacle 142. The barrier 144 may be sealed around the perimeter where the barrier 144 contacts the primary receptacle 140. In another implementation, the secondary receptacle 142 may be a separate housing that fits into a bottom of the housing portion 180.

Figure 6:
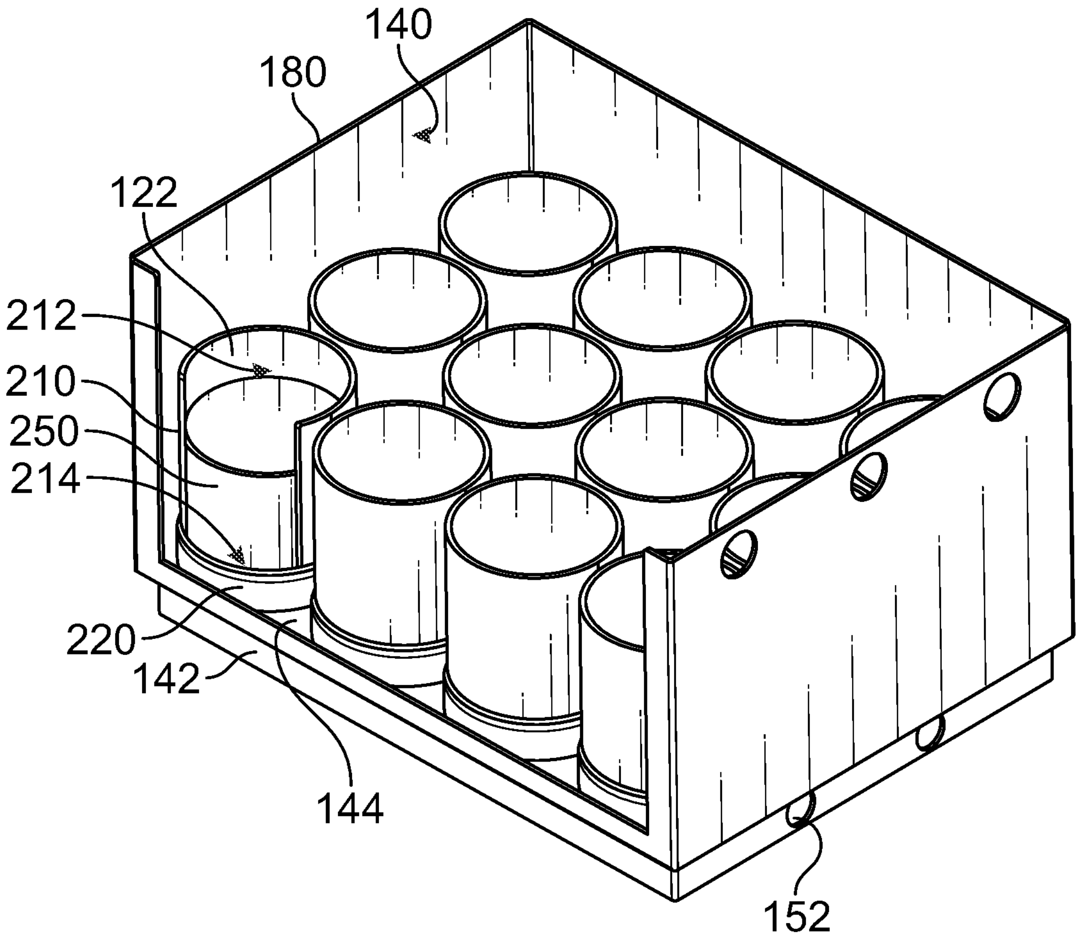
FIG. 6 is an isometric view of the housing portion of FIG. 5 in which examples of treatment tanks are mounted on the barrier with openings to the secondary receptacle.

FIG. 6 is an isometric view of the housing portion 180 of FIG. 5 in which examples of treatment tanks 122 are mounted on the barrier 144 with openings to the secondary receptacle 142. The treatment tanks 122 are depicted as a cylindrical container 210 where the treatment tank opening extends across at least a portion of a top 212 of the cylindrical container 210 opposite a bottom 214 of the cylindrical container 210, where the bottom 214 is configured to pass treated water through the treatment port 150 (see FIG. 3). The treatment tanks 122 attaches at the bottom end 214 to a corresponding one of the treatment ports 150 using a gasket housing 220. The gasket housing 220 is configured to provide a seal for the fluid passageway between the treatment tank and the secondary receptacle provided by the treatment port.

It is noted that while the examples illustrated in the figures and described in the specification are cylindrical in shape, the treatment tanks described herein may take any other suitable shape. In other implementations, the treatment tanks may be cube-shaped, or tanks having rectangular cross-sections or any other suitable shape. Similarly, the treatment ports of the treatment tanks opening to the secondary receptacle may be circular or any other suitable shape.

In one example implementation, the gasket housing 220 includes a ring clamp configured to secure the treatment tank over the treatment port. In another implementation, the gasket housing 220 includes a push-in gasket seal configured to secure the treatment tank over the treatment port. In another example implementation, the gasket housing 220 includes a threaded mechanism to secure the treatment tank over the treatment port. That is, the treatment tank 122 may be screwed into a fitting on the treatment port 150. The gasket housing 220 may also include a twist and lock mechanism to secure the treatment tank over the treatment port.

The example implementation in FIG. 6 depicts treatment tanks 122 configured to contain the filter media 250 within the tank cylinder. The treatment tanks 122 may be configured to be removable so that the filter media may be replaced after a period of time by replacing the treatment tanks 122. In this way, filter media capable of capturing the phosphorus can be replenished over time as needed.

In another implementation, the at least one treatment tank 122 may be fixedly attached over the corresponding one treatment ports and configured to support removable bags containing treatment media. In this way, the filter media my may be replenished over time by simply replacing the bag of filter media.

In example implementations, the treatment media includes engineered media having high sorption capacity. Examples of the engineered media include activated alumina, activated alumina containing iron oxide additives, mixtures of iron filings, iron, aluminum or lanthanum oxides, or combinations thereof, with sand, clay, or biochar, treatment residuals including water treatment residuals and acid mine drainage residuals, containing aluminum and/or iron oxides. In another example, the engineered media includes engineered iron or aluminum oxide materials. The engineered filter media may be provided in a density and volume that allows for the water runoff to contact the engineered media for a desired length of time. The area of the treatment ports, the volume of the treatment tanks, the number of treatment tanks in each water runoff treatment device, and the geometry of the inlet 132 and drain ports 152 may be adjusted to allow for the water runoff to contact the filter media for a desired length of time. In example implementations, the water runoff treatment devices 120 may be configured to allow for the water runoff to contact the filter media for about 1 to 2 minutes. In larger areas of soil through which water runoff passes, multiple water runoff treatment devices may be installed at multiple outlet drainage conduits to suitably treat the water runoff.

It is noted that example implementations described herein are configured for treatment of water runoff to capture phosphorus. The filter media used in the treatment tanks is engineered to capture phosphorus. The treatment tanks may be configured to capture other materials in addition or instead of phosphorus as may be desired in specific implementations.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A water runoff treatment device comprising:

a primary receptacle and a secondary receptacle separated by a barrier having at least one treatment port to permit water to pass from the primary receptacle to the secondary receptacle;

a runoff water inlet on one side of the primary receptacle, the runoff inlet connected to a drainage conduit to receive agricultural runoff water into the primary receptacle;

at least one treatment tank comprising a treatment medium mounted over a corresponding treatment port in the primary receptacle, where the treatment medium includes phosphorus sorption media comprising engineered media having high sorption capacity configured to remove dissolved phosphorus from the agricultural runoff water, the at least one treatment tank comprising a treatment tank opening on top of the treatment tank configured to receive water in the primary receptacle for treatment by the treatment medium, the at least one treatment tank connected to the treatment port to pass treated water into the secondary receptacle; and at least one drain port formed in the secondary receptacle to pass treated water out of the secondary receptacle and into a flow of treated water, wherein the water runoff treatment device is configured to receive the agricultural runoff water from the drainage conduit and to remove dissolved phosphorus from the agricultural runoff water by contact with the treatment medium, and wherein the at least one treatment tank, the at least one treatment port, and the at least one drain port are configured to provide a hydraulic residence time of the agricultural runoff water in contact with the treatment medium sufficient to achieve removal of dissolved phosphorus from the agricultural runoff water.

2. The water runoff treatment device of claim 1 where the secondary receptacle is formed as a separate chamber in which at least one opening on a top surface of the separate chamber forms the at least one treatment port, where the separate chamber is configured to sit in a bottom of the primary receptacle.

3. The water runoff treatment device of claim 1 where the primary receptacle and the secondary receptacle are divided by the barrier between the primary receptacle and the secondary receptacle, where the barrier provides a sealed surface between the primary receptacle and the secondary receptacle and having at least one opening to form the at least one treatment port.

4. The water runoff treatment device of claim 1 further comprising: an overflow port formed in the primary receptacle at an overflow height to pass excess water from the primary receptacle to the flow of treated water.

5. The water runoff treatment device of claim 1 where the primary receptacle and the secondary receptacle are made of a thermoplastic material.

6. The water runoff treatment device of claim 1 where the at least one treatment tank comprises a cylindrical container where the treatment tank opening extends across at least a portion of a top of the cylindrical container opposite a bottom of the cylindrical container configured to pass treated water through the treatment port.

7. The water runoff treatment device of claim 1 where the at least one treatment tank attaches at a bottom end to a corresponding at least one treatment port using a gasket housing to seal a fluid passageway between the treatment tank and the secondary receptacle.

8. The water runoff treatment device of claim 1 where the at least one treatment tank is fixedly attached over the corresponding at least one treatment port, the at least one treatment tank defining an interior space and being configured to support one or more removable bags positioned within the interior space of the treatment tank, each removable bag containing treatment media.

9. The water runoff treatment device of claim 1 where the treatment media includes any one of: activated alumina; activated alumina containing iron oxide additives; mixtures of iron filings, iron, aluminum or lanthanum oxides, or combinations thereof, with sand, clay, or biochar; or treatment residuals including water treatment residuals and acid mine drainage residuals, containing aluminum and/or iron oxides.

10. A system for treating agricultural runoff water comprising:

a network of drainage conduits extending in a layer of soil, the drainage conduits including openings on an upper side of the drainage conduits to allow for water in the soil to enter the drainage conduits, where the water flows in the drainage conduits to at least one outlet drainage conduit;

at least one water runoff treatment device coupled to a corresponding at least one of the outlet drainage conduits, where each of the at least one water runoff treatment devices comprises:

a primary receptacle and a secondary receptacle separated by a barrier having at least one treatment port to permit water to pass from the primary receptacle to the secondary receptacle;

a runoff water inlet on one side of the primary receptacle, the runoff inlet connected to a corresponding outlet drainage conduit to receive the agricultural runoff water into the primary receptacle;

at least one treatment tank comprising a treatment medium mounted over a corresponding treatment port in the primary receptacle, where the treatment medium includes phosphorus sorption media comprising engineered media having high sorption capacity configured to remove dissolved phosphorus from the agricultural runoff water, the at least one treatment tank comprising a treatment tank opening on top of the treatment tank configured to receive water in the primary receptacle for treatment by the treatment medium, the at least one treatment tank connected to the treatment port to pass treated water into the secondary receptacle; and at least one drain port formed in the secondary receptacle to pass treated water out of the secondary receptacle and into a flow of treated water, wherein the water runoff treatment device is configured to receive the agricultural runoff water from the drainage conduit and to remove dissolved phosphorus from the agricultural runoff water by contact with the treatment medium, and wherein the at least one treatment tank, the at least one treatment port, and the at least one drain port are configured to provide a hydraulic residence time of the agricultural runoff water in contact with the treatment medium sufficient to achieve removal of dissolved phosphorus from the agricultural runoff water.

11. The system of claim 10 where the primary receptacle and the secondary receptacle of the at least one water treatment device are made of a thermoplastic material.

12. The system of claim 10 where the at least one treatment tank of the at least one water treatment device comprises a cylindrical container where the treatment tank opening extends across at least a portion of a top of the cylindrical container opposite a bottom of the cylindrical container configured to pass treated water through the treatment port.

13. The system of claim 10 where the at least one treatment tank of the at least one water treatment device attaches at a bottom end to a corresponding at least one treatment port using a gasket housing to seal a fluid passageway between the treatment tank and the secondary receptacle.

14. The system of claim 10 where the treatment media in the at least one treatment tank includes any one of: activated alumina; activated alumina containing iron oxide additives; mixtures of iron filings, iron, aluminum or lanthanum oxides, or combinations thereof, with sand, clay, or biochar; treatment residuals including water treatment residuals and acid mine drainage residuals, containing aluminum and/or iron oxides.

* * * * *